US012689019B2

(12) United States Patent
Kim et al.

(10) Patent No.: US 12,689,019 B2
(45) Date of Patent: Jul. 21, 2026

(54) CALENDERING ROLLS OF CALENDERING ROLL PRESS FOR MANUFACTURING DRY ELECTRODE

(71) Applicant: LG Energy Solution, Ltd., Seoul (KR)

(72) Inventors: Soon Kim, Daejeon (KR); Dong Yeon Kim, Daejeon (KR); Jin Hak Kong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 443 days.

(21) Appl. No.: 18/269,023

(22) PCT Filed: Oct. 27, 2022

(86) PCT No.: PCT/KR2022/016548
§ 371 (c)(1),
(2) Date: Jun. 22, 2023

(87) PCT Pub. No.: WO2023/101222
PCT Pub. Date: Jun. 8, 2023

(65) Prior Publication Data
US 2024/0047641 A1 Feb. 8, 2024

(30) Foreign Application Priority Data
Dec. 3, 2021 (KR) ........................ 10-2021-0172114

(51) Int. Cl.
*H01M 4/04* (2006.01)
*B30B 11/16* (2006.01)

(52) U.S. Cl.
CPC ......... *H01M 4/0435* (2013.01); *B30B 11/165* (2013.01)

(58) Field of Classification Search
CPC ... H01M 4/0435; H01M 10/04; B30B 11/165; B30B 11/18; Y02E 60/10
See application file for complete search history.

(56) References Cited

U.S. PATENT DOCUMENTS 4,050,510 A 9/1977 Theysohn
4,685,183 A 8/1987 Justus
(Continued)

FOREIGN PATENT DOCUMENTS

CN 106252606 A 12/2016
CN 106252606 B * 7/2019 .......... H01M 4/0435
(Continued)

OTHER PUBLICATIONS

Extended European Search Report including Written Opinion for Application No. 22901581.3 dated Jul. 3, 2024, pp. 1-7.
(Continued)

*Primary Examiner* — Daniel H Lee
(74) *Attorney, Agent, or Firm* — Lerner David LLP

(57) ABSTRACT
A calendering roll of a calendering roll press for manufacturing a dry electrode disposed as a pair to press and elongate an electrode sheet in both directions includes: a cylindrical roll main body installed to extend in a width direction of the electrode sheet; a roll driving shaft installed to pass through a center portion of the roll main body in a longitudinal direction; and a plurality of oil paths formed outside the roll driving shaft to form a flow path through which oil flows, and formed to pass through the roll main body in the longitudinal direction. An interval between the oil path and the roll driving shaft is formed to be largest at both sides of the roll main body in the longitudinal direction, and is formed to be smallest at the center portion of the roll main body.

10 Claims, 8 Drawing Sheets

(56)                    References Cited

U.S. PATENT DOCUMENTS

| 5,816,143 | A | 10/1998 | Wagner et al. |
| 6,053,021 | A | 4/2000 | Bunten et al. |
| 2005/0003939 | A1 | 1/2005 | Womer et al. |

FOREIGN PATENT DOCUMENTS

| CN | 211700456 | U | | 10/2020 | |
| CN | 113020274 | A | * | 6/2021 | ........... B21B 38/006 |
| CN | 213944327 | U | | 8/2021 | |
| JP | H06001834 | U | | 1/1994 | |
| JP | H9324387 | A | | 12/1997 | |
| JP | H10192915 | A | | 7/1998 | |
| JP | H11204144 | A | | 7/1999 | |
| JP | H11239809 | A | | 9/1999 | |
| JP | 2000024702 | A | | 1/2000 | |
| JP | 2005288535 | A | | 10/2005 | |
| JP | 2011181348 | A | * | 9/2011 | |
| JP | 2013086111 | A | | 5/2013 | |
| JP | 2014042923 | A | | 3/2014 | |
| JP | 5704050 | B2 | | 4/2015 | |
| JP | 2016120503 | A | | 7/2016 | |
| JP | 2020170637 | A | | 10/2020 | |
| KR | 890000821 | B1 | | 4/1989 | |
| KR | 20120132840 | A | | 12/2012 | |
| KR | 101299374 | B1 | | 8/2013 | |
| KR | 102028611 | B1 | | 10/2019 | |
| KR | 102217721 | B1 | | 2/2021 | |

OTHER PUBLICATIONS

International Search Report for Application No. PCT/KR2022/016548 mailed Feb. 3, 2023. 3 pages.

* cited by examiner

【FIG. 1】
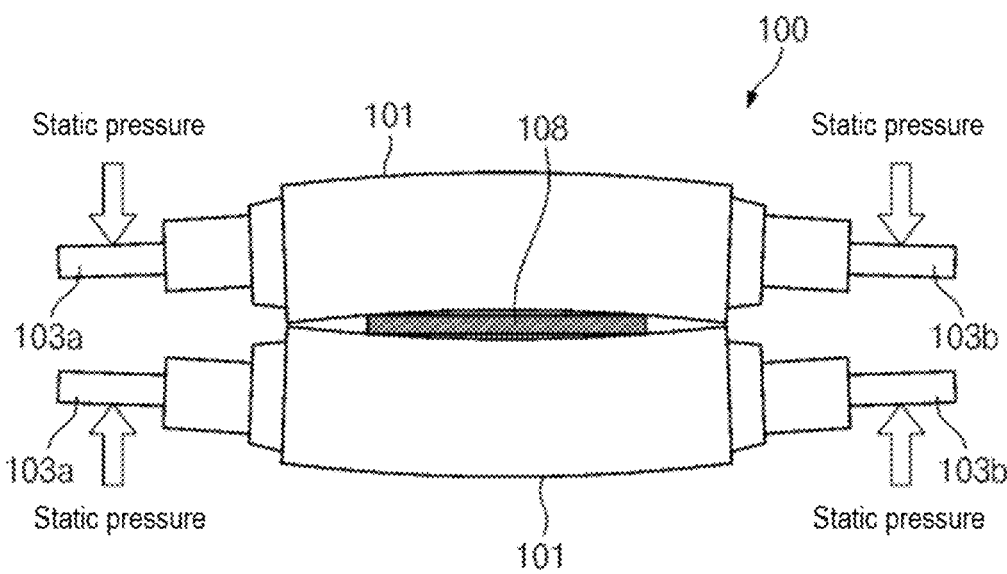
Prior Art

【FIG. 2】
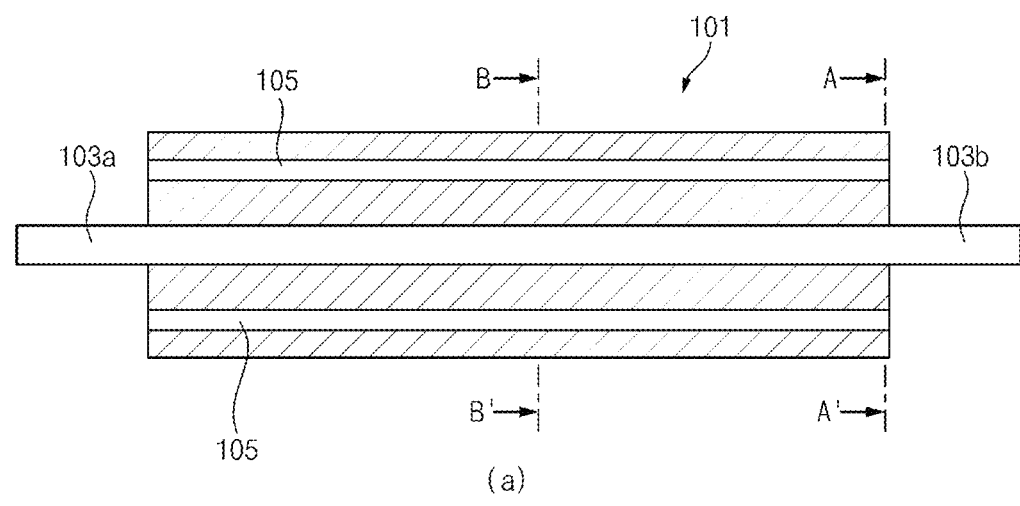
(a)
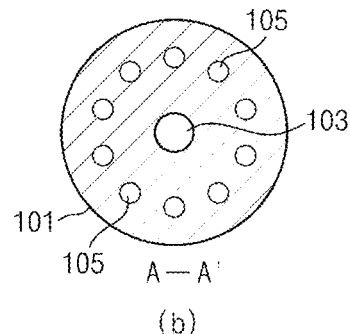
(b)
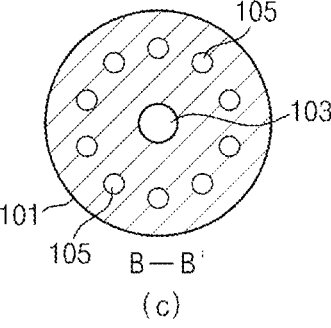
(c)
Prior Art

【FIG. 3】
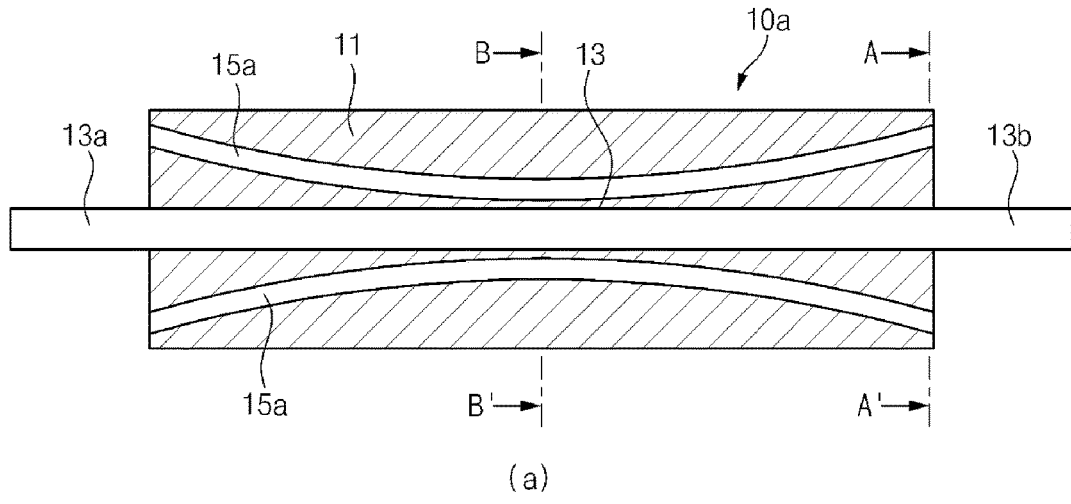
(a)
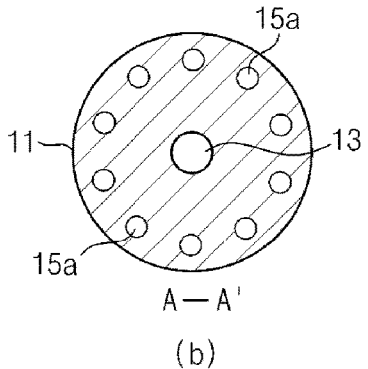
A—A'
(b)
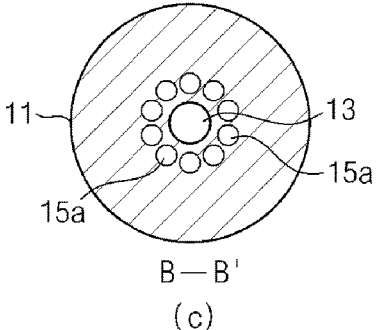
B—B'
(c)

【FIG. 4】
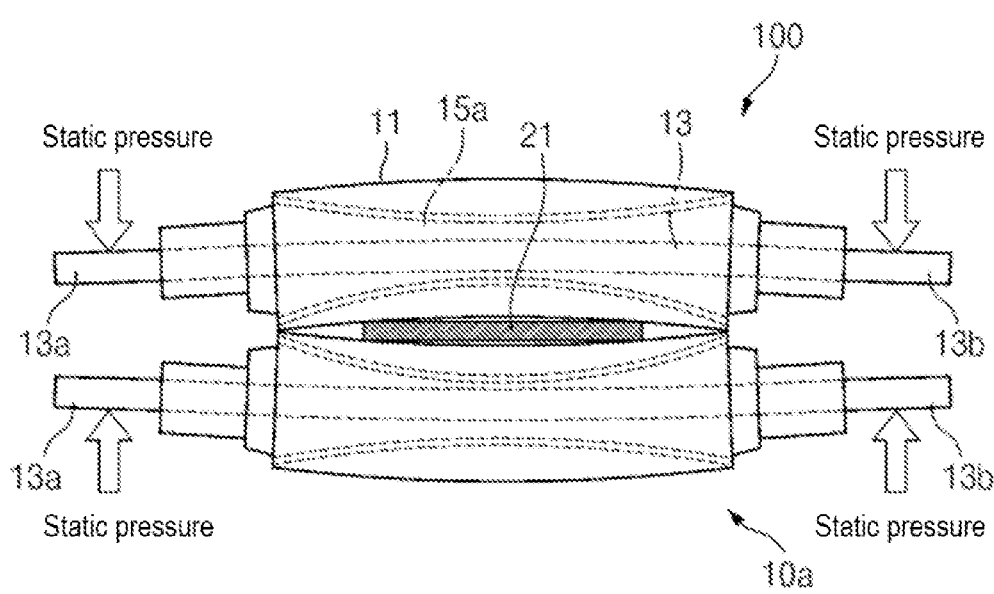

【FIG. 5】
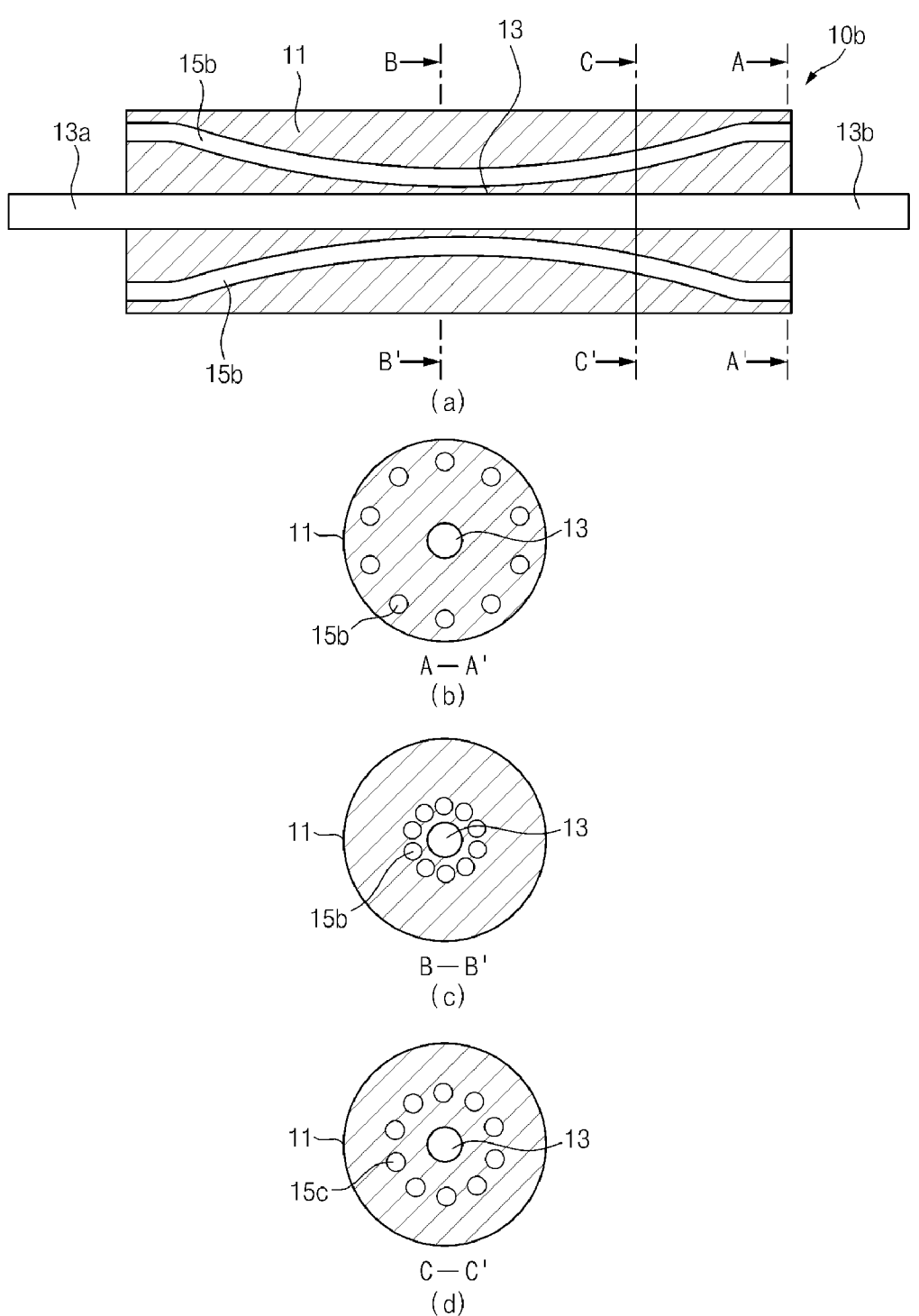

【FIG. 6】
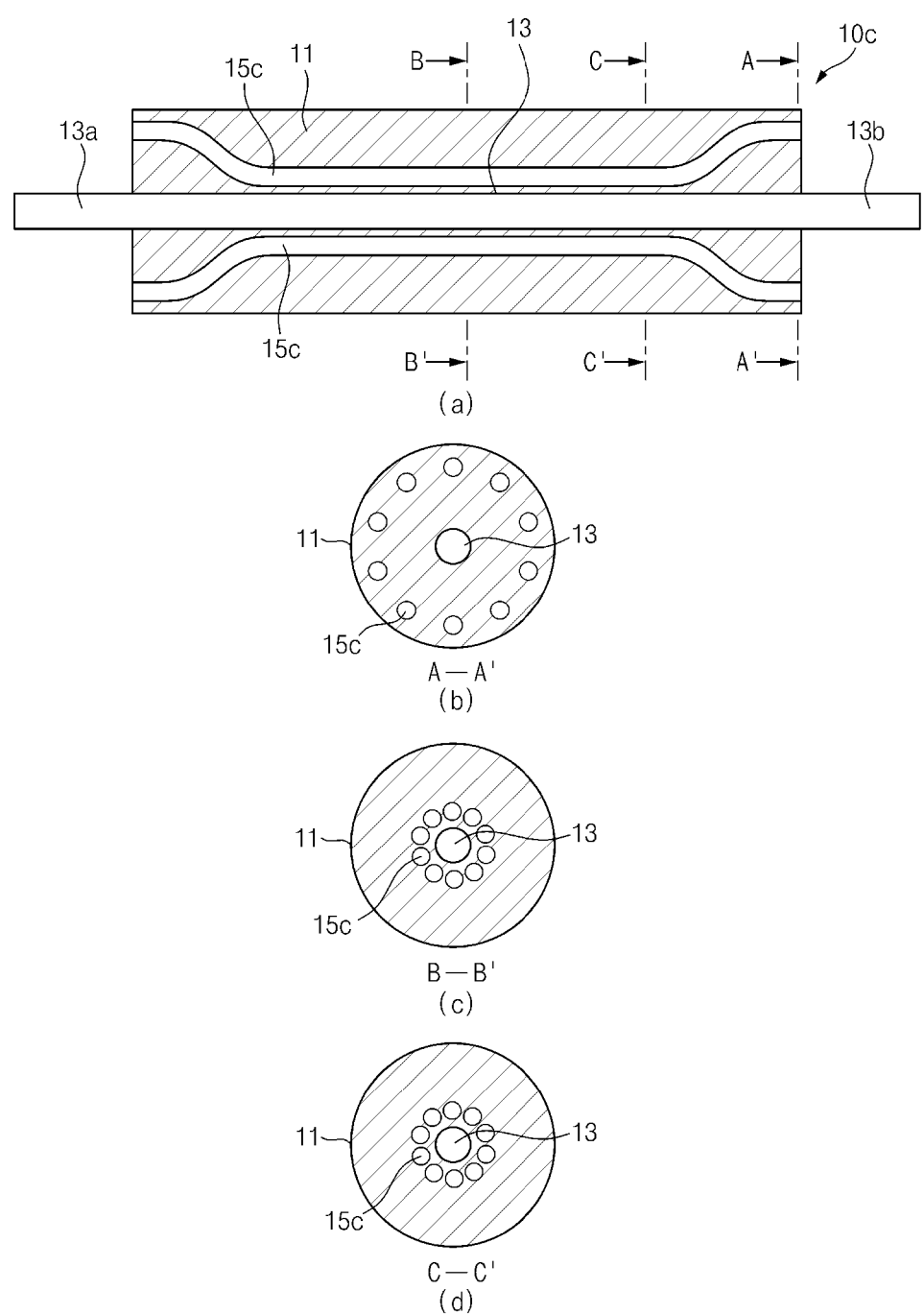

【FIG. 7】
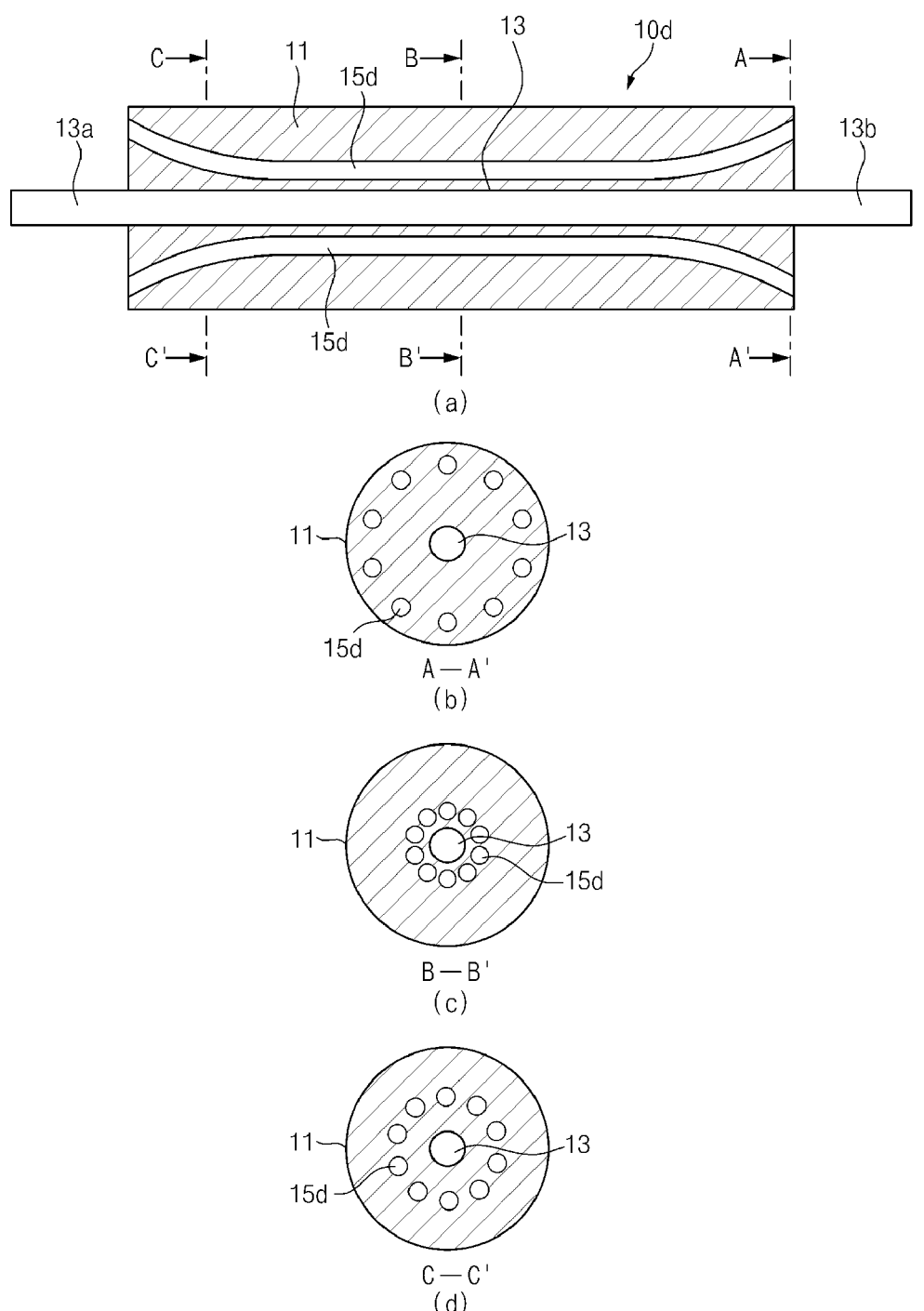

【FIG. 8】
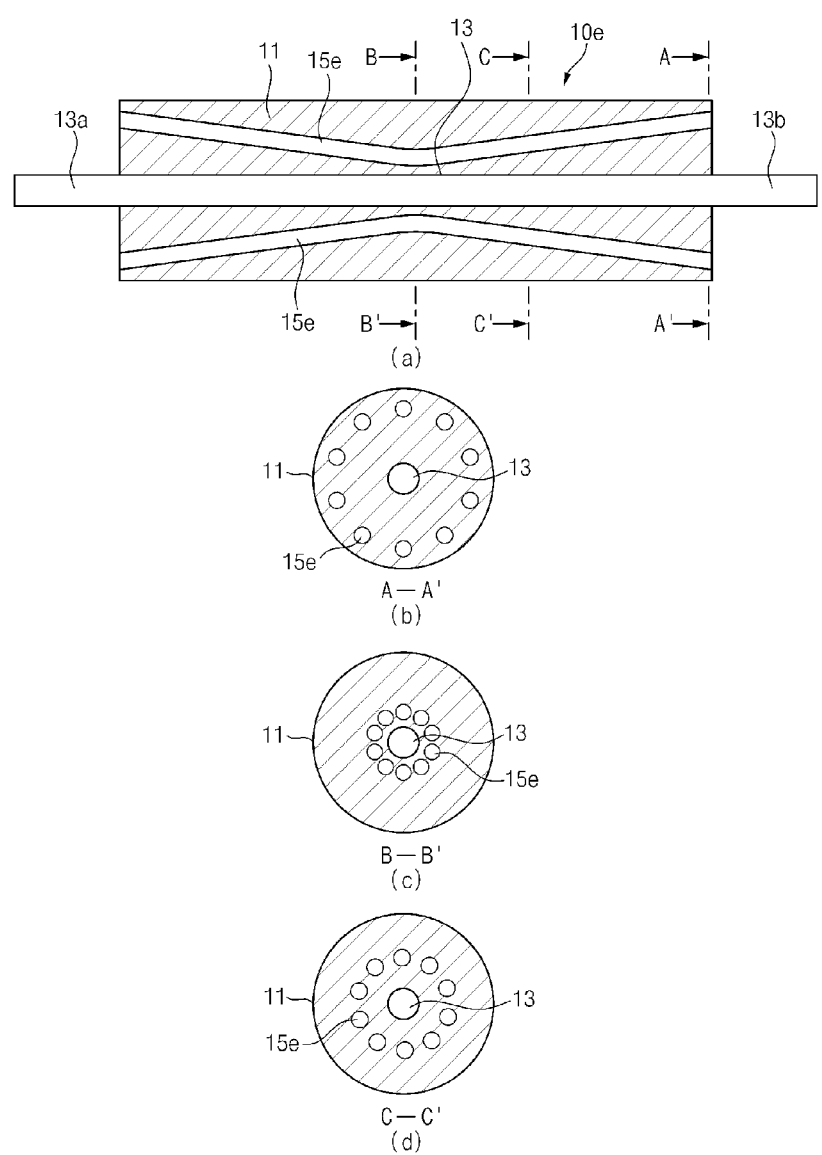

CALENDERING ROLLS OF CALENDERING ROLL PRESS FOR MANUFACTURING DRY ELECTRODE

CROSS-REFERENCE TO RELATED APPLICATIONS

The present application is a national phase entry under 35 U.S.C § 371 of International Application No. PCT/KR2022/016548 filed on Oct. 27, 2022 which claims the benefit of priority based on Korean Patent Application No. 10-2021-0172114, filed on Dec. 3, 2021, all contents of which are incorporated herein by reference.

TECHNICAL FIELD

This application claims the benefit of priority based on Korean Patent Application No. 10-2021-0172114, filed on Dec. 3, 2021, and the entire contents of the Korean patent application are incorporated herein by reference.

The present invention relates to a calendering roll of a calendering roll press for manufacturing a dry electrode.

More specifically, the present disclosure relates to a calendering roll of a calendering roll press for manufacturing a dry electrode capable of reducing a deformation deviation of the roll by improving an oil path in the calendering roll to increase bending rigidity.

Further, the present disclosure relates to a calendering roll of a calendering roll press for manufacturing a dry electrode capable of minimizing a deformation of a dry electrode sheet.

BACKGROUND ART

Recently, secondary batteries, which can be charged and discharged, have been widely used as energy sources of wireless mobile devices.

Further, the secondary batteries have attracted attention as energy sources for not only a portable device such as a mobile phone, a notebook, a camcorder, or the like, but also an electric vehicle, a hybrid electric vehicle, and the like which have been proposed as solutions for the air pollution or the like of an existing gasoline vehicle, a diesel vehicle, and the like using fossil fuel.

Accordingly, types of applications using the secondary batteries are becoming very diverse due to the advantages of the secondary batteries, and in the future, it is expected that secondary batteries will be applied to more fields and products than now.

These secondary batteries are classified into a lithium ion battery, a lithium ion polymer battery, a lithium polymer battery, and the like according to compositions of an electrode and an electrolyte, and the use of the lithium ion polymer battery which has low possibility of electrolyte leakage and can be easily manufacture is increasing.

Generally, depending on the shape of the battery case, the secondary batteries are classified into a cylindrical battery and a prismatic battery in which electrode assemblies are respectively accommodated in a cylindrical metal can and a prismatic metal can, and a pouch-type battery in which an electrode assembly is accommodated in a pouch-type case of an aluminum laminate sheet.

Further, the electrode assemblies accommodated in the battery cases are power generation elements which are each formed in a structure having a positive electrode, a negative electrode, and a separator interposed between the positive electrode and the negative electrode, and thus can be charged and discharged, and are classified into a jelly-roll type in which a separator is interposed between long sheet-type positive and negative electrodes coated with an active material and is rolled, and a stacked type in which a plurality of positive and negative electrodes which are formed in a predetermined size are sequentially stacked with the separator interposed therebetween.

Here, since high-output electric energy is used in an electric vehicle or the like, a plurality of battery modules is required, and a plurality of battery cells are connected in series or parallel in this battery module.

Meanwhile, in an electrode process, an electrode has been generally manufactured through a wet electrode process of applying a slurry including an electrode active material, a binder, and a conductive material onto a current collector and then removing a solvent of the slurry through a drying process.

In the wet electrode process described above, since energy is required to remove the solvent from the slurry applied to the current collector, manufacturing costs are high and thus it is difficult to improve productivity.

Accordingly, a method of manufacturing an electrode through a dry electrode process without applying a slurry to a current collector has been proposed.

The dry electrode process is a method of manufacturing an electrode by preparing a powder mixture by mixing an electrode active material, a binder, a conductive material, and the like without a liquid medium such as a solvent, a dispersion medium, or the like, manufacturing the powder mixture into a dry electrode sheet through a calendering process, and laminating the manufactured dry electrode sheet on the current collector.

In this dry electrode process, since energy density is improved and charging and discharging characteristics are improved compared to the existing wet electrode process and thus a lifespan is at least doubled compared to the existing wet electrode process, and a drying process required in the existing wet electrode process is not required, there is an advantage in that a drying room for the drying process, a space therefore, and costs of drying energy are not required.

Here, in the dry electrode process, the calendering process for manufacturing the dry electrode sheet refers to a process of pressing and elongating the dry electrode sheet through a calendering roll press.

That is, as shown in FIG. 1, a calendering roll 101 of a calendering roll press 100 is formed with a cylindrical body, and a calendering process is performed so that a dry electrode sheet 108 is pushed between and passes through a pair of upper and lower rolls 101 to be elongated.

In this case, the calendering roll 101 is rotatably formed, and driving shafts 103a and 103b are respectively provided at center portions of both sides.

Here, the pair of calendering rolls have a problem in that static pressure is applied to each driving shaft and thus center portions of the calendering rolls are bent.

Like the above, since the center portions of the calendering rolls are bent by the static pressure applied to each driving shaft, the static pressure acts strongly on both sides of the dry electrode sheet compared to the center portion, and thus uniform deformation of the dry electrode sheet is hindered.

Further, there is a problem in that a buckling phenomenon occurs at both sides of the calendering roll due to static pressure repeatedly applied to the driving shafts of the calendering roll and thus a defect occurs in a dry electrode sheet to be manufactured.

Like the above, in order to suppress the defect of the dry electrode sheet, a method of additionally applying counter pressure which counteracts the static pressure applied to the calendering roll has been proposed, but since counter pressure equipment which generates the counter pressure which counteracts the static pressure should be additionally installed, there is a problem in that an entire configuration of the calendering roll press becomes complicated when installing the counter pressure equipment in addition to the generation of additional costs.

Further, a method of replacing the existing calendering roll formed in a cylindrical shape with a calendering crown roll, formed in a gently convex curve line shape in a longitudinal direction by forming a larger diameter at a center portion than the diameter at both sides of the roll, to suppress the buckling phenomenon caused by static pressure has been proposed, but this also has a problem in that the buckling phenomenon is caused at the center portion of the dry electrode sheet.

Meanwhile, as shown in FIG. 2, in a calendering roll 101 having driving shafts 103*a* and 103*b* formed on both sides, a plurality of oil paths 105 through which oil flows are formed for temperature control, and the oil path 105 is formed in a straight line shape from one side of the calendering roll 101 to the other side in a longitudinal direction.

However, since the plurality of oil paths are formed in the calendering roll in the longitudinal direction, the bending rigidity of the center portion of the calendering roll deteriorates when static pressure is applied to both driving shafts.

Accordingly, in order to improve the production quality of the dry electrode sheet and suppress a defect of the dry electrode sheet, there is a need to minimize the roll deformation due to the static pressure applied to both side ends of the calendering roll within a width of the dry electrode sheet.

DISCLOSURE

Technical Problem

The present invention is intended to solve the above problems, and is directed to providing a calendering roll of a calendering roll press for manufacturing a dry electrode capable of reducing a deformation deviation of the roll by improving a shape of an oil path through which oil flows in the calendering roll to increase bending rigidity.

Further, the present invention is directed to providing a calendering roll of a calendering roll press for manufacturing a dry electrode capable of minimizing the deformation of a dry electrode sheet.

Technical Solution

In order to accomplish the above-described tasks, the present invention includes a calendering roll of a calendering roll press for manufacturing a dry electrode disposed as a pair to press and elongate an electrode sheet in both directions, including: a cylindrical roll main body installed to extend in a width direction of the electrode sheet; a roll driving shaft installed to pass through a center portion of the roll main body in a longitudinal direction; and a plurality of oil paths formed outside the roll driving shaft to form a flow path through which oil flows, and to pass through the roll main body in the longitudinal direction, wherein an interval between the oil path and the roll driving shaft is formed to be largest at both sides of the roll main body in the longitudinal direction, and is formed to be smallest at the center portion of the roll main body.

As one example, the oil path may be formed so that the interval may linearly change from one side in the longitudinal direction of the roll main body toward the center portion.

Specifically, the oil path may be formed in a curved shape from one side in the longitudinal direction of the roll main body toward the center portion.

More specifically, the oil path may be formed in a parabolic shape along the longitudinal direction of the roll main body.

As another example, the oil path may form a shape bent toward the other side from one side in the longitudinal direction of the roll main body.

Specifically, the oil paths may be formed linearly with the constant intervals to a predetermined position from both sides of the roll main body in the longitudinal direction in directions facing each other, and then formed so that each of the intervals may linearly change toward the center portion.

More specifically, the oil paths may be formed linearly with the constant intervals to a predetermined position from both sides of the roll main body in the longitudinal direction in directions facing each other, and then each formed in a curved shape toward the center portion.

More specifically, the curved shape may be a parabolic shape.

As another example, the oil paths may be formed linearly with the constant intervals to a predetermined position from both sides of the roll main body in the longitudinal direction in directions facing each other and bent toward the roll driving shaft, and then may each form a shape in which each of the intervals is uniformly maintained toward the center portion.

As another example, the oil paths may be bent to a predetermined position from both sides of the roll main body in the longitudinal direction toward the roll driving shaft, and then may each form a shape in which each of the intervals is uniformly maintained toward the center portion.

As another example, the oil paths may be formed to be inclined at a predetermined angle from both sides of the roll main body in the longitudinal direction toward the roll driving shaft, and then may meet each other to form a curved boundary in the center portion.

Advantageous Effects

According to an aspect of the present invention, bending rigidity can be sufficiently increased by only improving shapes of oil paths through which oil flows in a calendering roll, and accordingly, a deformation deviation of the roll can be reduced.

Further, as the deformation deviation of the roll is improved, production quality of a dry electrode sheet can be improved and defects can be suppressed by minimizing the deformation of the dry electrode sheet.

Further, when the calendering roll is pressed by static pressure, a buckling phenomenon occurring at both side ends of the calendering roll and a center portion of the dry electrode sheet can also be prevented.

BRIEF DESCRIPTION OF THE DRAWINGS

FIG. 1 is a view schematically illustrating a calendering process through a calendering roll of a calendering roll press for manufacturing a dry electrode according to the related art.

FIG. 2 is a side-sectional view schematically illustrating the calendering roll of the calendering roll press for manufacturing the dry electrode according to the related art.

FIG. 3 is a view schematically illustrating a calendering roll of a calendering roll press for manufacturing a dry electrode according to a first embodiment of the present invention.

FIG. 4 is a view schematically illustrating a calendering process through calendering rolls according to the present embodiment.

FIG. 5 is a view schematically illustrating a calendering roll of a calendering roll press for manufacturing a dry electrode according to a second embodiment of the present invention.

FIG. 6 is a view schematically illustrating a calendering roll of a calendering roll press for manufacturing a dry electrode according to a third embodiment of the present invention.

FIG. 7 is a view schematically illustrating a calendering roll of a calendering roll press for manufacturing a dry electrode according to a fourth embodiment of the present invention.

FIG. 8 is a view schematically illustrating a calendering roll of a calendering roll press for manufacturing a dry electrode according to a fifth embodiment of the present invention.

REFERENCE NUMERALS

10*a*, 10*b*, 10*c*, 10*d*, 10*e*: calendering roll
11: roll main body
13*a*, 13*b*: roll driving shaft
15*a*, 15*b*, 15*c*, 15*d*, 15*e*: oil path
21: dry electrode sheet

DETAILED DESCRIPTION

An embodiment of the present invention provides a calendering roll of a calendering roll press for manufacturing a dry electrode disposed as a pair to press and elongate an electrode sheet in both directions, including: a cylindrical roll main body installed to extend in a width direction of the electrode sheet; a roll driving shaft installed to pass through a center portion of the roll main body in a longitudinal direction; and a plurality of oil paths formed outside the roll driving shaft to form a flow path through which oil flows, and to pass through the roll main body in the longitudinal direction, wherein an interval between the oil path and the roll driving shaft is formed to be largest at both sides of the roll main body in the longitudinal direction, and is formed to be smallest at the center portion of the roll main body.

MODE FOR INVENTION

Hereinafter, embodiments the present invention will be described in detail. Prior to this, the terms and words used in the present specification and claims should not be construed as being limited to ordinary or dictionary terms, and should be interpreted as meanings and concepts consistent with the technology or the proposed technical spirit based on the principle that the inventor may appropriately define the concept of a term to describe the technology thereof in the best way.

It should be understood that terms such as "include" and "have" used throughout the specification are intended to indicate that the presence of a feature, number, step, operation, component, part, or a combination thereof described on the specification, but do not exclude the possibility of the presence or addition of one or more other features, numbers, steps, operations, components, or combinations thereof in advance.

Further, when a portion such as a layer, a film, a region, a plate, or the like is referred to as being "on" another portion, this includes not only a case in which the portion is "directly on" the other portion but also a case in which there is a still another portion therebetween. On the other hand, when a portion such as a layer, a film, a region, a plate, or the like is referred to as being "under" another portion, this includes not only a case in which the portion is "directly under" the other portion but also a case in which there is still another portion therebetween. Further, being disposed "on" in the specification may mean that something is disposed on a lower portion or on an upper portion.

In addition, when a portion such as a layer, a film, a region, a plate, or the like is referred to as being "on" another portion, this includes not only a case in which the portion is "directly on" the other portion but also a case in which there is a still another portion therebetween. On the other hand, when a portion such as a layer, a film, a region, a plate, or the like is referred to as being "under" another portion, this includes not only a case in which the portion is "directly under" the other portion but also a case in which there is still another portion therebetween. Further, being disposed "on" in the present application may mean that something is disposed on a lower portion or on an upper portion.

First Embodiment

FIG. 3 is a view schematically illustrating a calendering roll of a calendering roll press for manufacturing a dry electrode according to a first embodiment of the present invention. FIG. 4 is a view schematically illustrating a calendering process through the calendering roll according to the present embodiment.

As shown in FIG. 3, calendering rolls 10*a* of a calendering roll press for manufacturing a dry electrode includes a cylindrical roll main body 11 disposed as a pair, a roll driving shaft 13 formed at each of a center portion of the roll main bodies 11, and oil paths 15*a* forming a flow path through which oil flows in the roll main body 11.

As shown in FIG. 4, the roll main body 11 is rotatably disposed as a pair, and is formed in a cylindrical shape extending in a width direction of a dry electrode sheet 21.

According to the above-described structure, the dry electrode sheet 21 inserted between the roll main bodies 11 in the pair of calendering rolls 10*a* is elongated while passing between the roll main bodies 11.

The roll driving shaft 13 is formed in a shaft shape and is installed to pass through at the center portion of the roll main body 11 in a longitudinal direction, and the roll driving shafts 13 are disposed to protrude from the center portions of both sides of the roll main body 11, respectively.

The oil paths 15*a* are provided so that oil for temperature control of the calendering roll 10*a* flows, and thus are formed in the roll main body 11, form a flow path through which oil flows outside the roll driving shaft 13, and are formed to pass through the roll main body 11 in the longitudinal direction.

In this case, a plurality of oil paths 15*a* are radially formed outside the roll driving shaft 13.

Here, according to the first embodiment of the present invention, an interval between the oil path 15*a* and the roll driving shaft 13 is formed to be largest at both sides of the roll main body 11 in the longitudinal direction, and is formed to be smallest at the center portion of the roll main body 11.

The shape of each of the oil paths 15*a* is provided to increase the bending rigidity of the roll main body 11 against the static pressure applied to each of the roll driving shafts 13*a* and 13*b*, and thus the oil paths 15*a* at both sides of the roll main body 11 are formed at a large interval from the roll driving shaft 13 and thus are disposed away from the roll driving shaft 13, and the oil paths 15*a* at the center portion of the roll main body 11 are formed with a small interval from the roll driving shaft 13 and are disposed close to the roll driving shaft 13.

Accordingly, the interval between the oil path 15*a* and the roll driving shaft 13 is formed to be largest at both sides of the roll main body 11 in the longitudinal direction and the interval between the oil path 15*a* and the roll driving shaft 13 is formed to be smallest at the center portion of the roll main body 11.

Like this, since the interval between the oil path 15*a* and the roll driving shaft 13 at both sides of the roll main body 11 in the longitudinal direction is maximally secured, the bending rigidity against the static pressure applied to each of the roll driving shafts 13*a* and 13*b* is increased.

In the first embodiment, the oil path 15*a* is formed so that the interval to the roll driving shaft 13 linearly changes from one side in the longitudinal direction of the roll main body 11 toward the center portion. That is, the oil path 15*a* is formed so that the interval between the oil path 15*a* and the roll driving shaft 13 linearly changes from one side in the longitudinal direction of the roll main body 11 toward the center portion.

According to the illustrated embodiment, the oil path 15*a* is formed in a curved shape from one side in the longitudinal direction of the roll main body 11 toward the center portion.

More specifically, the oil path 15*a* is formed in a parabolic shape along the longitudinal direction of the roll main body 11.

In the illustrated first embodiment of the present invention, the curved shape of the oil path 15*a* is formed in the parabolic shape, but may also be formed in a circular arc shape or an oval shape, and may be changed to other various curved shapes.

According to the above-described structure, when static pressure is applied to each of the roll driving shafts 13*a* and 13*b* protruding from both side ends of the calendering roll 10*a*, the center portion of the roll main body 11 of the calendering roll 10*a* having a main problem of deformation due to static pressure is greatly amplified by a distance in proportion to the amount of deformation which occurs at both sides of the roll main body 11, and since the bending rigidity against static pressure is increased as much as the interval to the oil path 15*a* at both sides of the roll main body 11 that is secured to be larger, consequently, conventional problems such as bending of the center portion of the calendering roll 10*a*, and strong static pressure acting on both sides of the roll main body 11 are both solved.

Like this, since the interval between the oil path 15*a* and the roll driving shaft 13 is configured to be smaller toward the center portion of the roll main body 11, the bending rigidity of the calendering roll 10*a* may be increased, and accordingly, the deformation of the center portion of the roll main body 11 which comes into contact with the center of the dry electrode sheet 21 may be reduced, and a deformation deviation from the center to an end of the dry electrode sheet 21 may be minimized.

In an embodiment of the present invention, although a configuration which increases the bending rigidity against the static pressure applied to each of the roll driving shafts 13*a* and 13*b* formed at both sides of the calendering roll 10*a* by improving the oil paths 15*a* of the calendering roll 10*a* applied to the calendering process is described, the bending rigidity of the roll against the static pressure may also be improved by applying the above-described structure to a roll or the like of a press process and a lamination process applied to a secondary battery manufacturing process.

Second Embodiment

FIG. 5 is a view schematically illustrating a calendering roll of a calendering roll press for manufacturing a dry electrode according to a second embodiment of the present invention.

As shown in FIG. 5, a calendering roll 10*b* according to the present embodiment is formed in a shape in which oil paths 15*b* formed in a roll main body 11 are bent toward the other side from one side in a longitudinal direction of the roll main body 11.

Here, the oil paths 15*b* are formed linearly to a predetermined position from both sides of the roll main body 11 in the longitudinal direction toward the inside, and then formed so that an interval to the roll driving shaft 13 linearly changes toward a center portion.

That is, in the second embodiment, the oil paths 15*b* are each formed in a straight line shape with the constant interval to the roll driving shaft 13 to a predetermined position from both sides of the roll main body 11 in the longitudinal direction, and then formed in a shape in which the interval linearly changes toward the center portion from the end portion of the oil path 15*b*.

Further, the oil path 15*b* may be formed in a curved shape toward the center portion after being formed linearly to the predetermined position of the roll main body 11.

For example, the linearly curved shape may be a parabolic shape.

In the present embodiment, it is described that the curved shape of the oil path 15*b* is formed in the parabolic shape, but the oil path 15*b* may also be formed in a circular arc shape or an oval shape, and may be changed to other various shapes.

Third Embodiment

FIG. 6 is a view schematically illustrating a calendering roll of a calendering roll press for manufacturing a dry electrode according to a third embodiment of the present invention.

As shown in FIG. 6, oil paths 15*c* formed in a roll main body 11 of a calendering roll according to the present embodiment are formed linearly to a predetermined position from both sides of the roll main body 11 in a longitudinal direction in directions facing each other and bent toward a roll driving shaft 13, and after bending, the oil paths 15*c* each have a shape in which each of the intervals is uniformly maintained toward a center portion.

That is, a configuration in which the oil paths 15*c* of a calendering roll 10*c* of the third embodiment are formed linearly to the predetermined position from both sides of the roll main body 11 in the longitudinal direction toward the inside is like the second embodiment, but there is a difference in that the oil path 15*c* is formed to be bent toward the roll driving shaft 13 after a portion formed linearly in the oil path 15*c*, and then is formed in a straight line toward the center portion from the portion formed to be bent in the configuration.

According to the above-described structure, the oil path 15c of the present embodiment is formed so that the remaining portion except for the portion formed to be bent maintains the same interval to the roll driving shaft 13.

Here, in the oil path 15c, it is preferable that the portion bent toward the roll driving shaft 13 is obliquely formed to be bent in a diagonal direction for flow of oil, and may be changed in other various ways.

Fourth Embodiment

FIG. 7 is a view schematically illustrating a calendering roll of a calendering roll press for manufacturing a dry electrode according to a fourth embodiment of the present invention.

As shown in FIG. 7, oil paths 15d formed in a roll main body 11 of a calendering roll according to the present embodiment are bent inward to a predetermined position from both sides of the roll main body 11 in a longitudinal direction, and then each have a shape in which each of the intervals is uniformly maintained.

That is, the oil paths 15d of a calendering roll 10d of the fourth embodiment are bent to the predetermined position from both sides of the roll main body 11 in the longitudinal direction in directions facing each other, and then each formed in a straight line toward a center portion from the bent portion of the oil path 15d.

According to the above-described structure, the oil path 15d of the present embodiment is formed so that the remaining portion except for the bent portions at both sides of the roll main body 11 maintains the same interval to the roll driving shaft 13.

Fifth Embodiment

FIG. 8 is a view schematically illustrating a calendering roll of a calendering roll press for manufacturing a dry electrode according to a fifth embodiment of the present invention.

As shown in FIG. 8, oil paths 15e formed in a roll main body 11 of a calendering roll 10e according to the present embodiment are formed to be inclined at a predetermined angle from both sides of the roll main body 11 in the longitudinal direction in directions facing each other, and then connected to a center portion in a curved shape.

That is, the oil paths 15e of the calendering roll 10e of the fifth embodiment are formed to be inclined at a predetermined angle to the predetermined position from both sides of the roll main body 11 in the longitudinal direction in directions facing each other, and thus are formed in an approximate 'V' shape, and since a center portion of the oil path 15e forms a curved shape, the oil paths 15e extending to be inclined from both sides of the roll main body 11 are smoothly connected to each other.

According to the above-described structure, as described in the first embodiment, since the oil paths 15e of the present embodiment are disposed away from the roll driving shaft 13 at both sides of the roll main body 11, and on the other hand, the oil paths 15e are disposed close to the roll driving shaft 13 at the center portion of the roll main body 11, the bending rigidity of the roll main body 11 against the static pressure applied to each of the roll driving shafts 13a and 13b may be increased.

Hereinafter, although the present invention has been illustrated and described in relation to specific embodiments, those skilled in the art may easily understand that various modifications and changes are possible without departing from the spirit and scope of the present invention shown in the appended claims.

The invention claimed is:

1. A calendering roll of a calendering roll press for manufacturing a dry electrode the calendering roll comprising:
   a cylindrical roll main body installed to extend in a width direction of an electrode sheet;
   a roll driving shaft disposed to pass through a center axis of the cylindrical roll main body in a longitudinal direction; and
   a plurality of oil paths provided in the cylindrical roll main body that pass through the cylindrical roll main body in the longitudinal direction, wherein the plurality of oil paths are disposed between the roll driving shaft and an exterior of the cylindrical main body,
   wherein an interval between the plurality of oil paths and the roll driving shaft is largest at both ends of the cylindrical roll main body in the longitudinal direction and is smallest at a center portion of the cylindrical roll main body in the longitudinal direction.

2. The calendering roll of claim 1, wherein the interval linearly changes from one end of the cylindrical roll main body toward the center portion.

3. The calendering roll of claim 1, wherein the plurality of oil paths have a curved shape extending from one end of the cylindrical roll main body toward the center portion.

4. The calendering roll of claim 3, wherein the plurality of oil paths have a parabolic shape extending along the cylindrical roll main body.

5. The calendering roll of claim 1, wherein the plurality of oil paths extend in a constant interval from each end of the cylindrical roll main body toward a predetermined position in the longitudinal direction,
   wherein the interval of the plurality of oil paths linearly changes extending from the predetermined position to the center portion.

6. The calendering roll of claim 1, wherein the plurality of oil paths extend in a constant interval from each end of the cylindrical roll main body toward a predetermined position in the longitudinal direction,
   wherein the interval of the plurality of oil paths each have a curved shape extending from the predetermined position to the center portion.

7. The calendering roll of claim 6, wherein the curved shape is a parabolic shape.

8. The calendering roll of claim 1, wherein the plurality of oil paths extend in a first constant interval from each end of the cylindrical roll main body to a first predetermined position,
   wherein the plurality of oil paths bend toward the roll driving shaft between the first predetermined position and a second predetermined position, and
   wherein the plurality of oil paths extend in a second constant interval from the second predetermined position toward the center portion.

9. The calendering roll of claim 1, wherein the plurality of oil paths extending from both ends of the cylindrical roll main body in the longitudinal direction are bent to a predetermined position toward the roll driving shaft, and
   wherein the plurality of oil paths extend in a constant interval from the predetermined position toward the center portion.

10. The calendering roll of claim 1, wherein the plurality of oil paths extend at a predetermined angle from both ends of the cylindrical roll main body and extend in the longitudinal direction toward the roll driving shaft, wherein the plurality of oil paths are adjacent to each other in the center portion.

\* \* \* \* \*